2,848,356

Patented Aug. 19, 1958

2,848,356

FUNGICIDES, THEIR PREPARATION AND USE

James E. Pritchard, Bartlesville, Okla., assignor to Phillips Petroleum Company, a corporation of Delaware No Drawing. Application August 30, 1954
Serial No. 453,123

22 Claims. (Cl. 117—138.5)

This invention relates to fungicidal polymeric quaternary salts as new compositions of matter, their preparation, articles impregnated with them, and to a process for impregnating textiles and other absorbent articles with these salts to render the materials resistant to attack by fungi, bacteria, and other similar organisms.

Salts of heavy metals are well-known fungicides. Fabrics impregnated with particular members of this class of compounds show a high degree of mildew resistance, but, because of the ease with which these compounds are removed from the fabric upon exposure to moisture and weathering conditions, the effect is not lasting during service conditions. It has now been found that products formed by the reaction of the heavy metal salt of an organic carboxylic acid containing an active halogen atom with a heterocyclic nitrogen base polymer retain the fungicidal and fungistatic properties characteristic of these heavy metal salts. When used to treat fabrics they have the advantage of being retained in the fabric during exposure to moisture and weathering conditions for much longer periods of time than the metal salts alone. In addition, they impart to the fabrics a high degree of water repellency. The ability of vinylpyridine polymers to render fabrics and other porous materials water repellent is set forth in greater detail in copending applications Serial No. 274,660, now U. S. Patent No. 2,702,763, and Serial No. 284,448 of J. E. Pritchard. Examples of fabrics to be treated according to this invention are woolens, felt, fur, and similar textile materials which are subject to fungus attack.

One object of this invention is to provide quaternary metal salts of polymers formed from a heterocyclic base of the pyridine or quinoline series. A further object is to provide a method of preparing such quaternary metal salts. Another object is to provide an article impregnated with the quaternary metal salts of this invention and thereby rendered waterproof and repellent to fungi. An additional object is the provision of a process for impregnating an absorbent article with the quaternary metal salts of this invention.

New compositions of this invention are prepared from polymers of heterocyclic nitrogen bases of the pyridine and quinoline series containing a vinyl or alpha-methylvinyl group. Homopolymers, copolymers, terpolymers, etc., all produce valuable products. Monomers copolymerizable with these heterocyclic nitrogen bases include compounds containing an active CH₂=C< group. Examples of such compounds which are widely used include styrene; substituted styrenes, such as alkyl, alkoxy, and halogenated substituted styrenes; acrylonitrile; methacrylonitrile; methyl acrylate; methyl methacrylate; ethyl acrylate; butyl acrylate; conjugated dienes, and the like. Also, polymers can be prepared from various mixtures of these heterocyclic nitrogen bases containing a vinyl or alpha-methylvinyl group, one or more conjugated dienes, and one or more polymerizable materials containing the vinyl or alpha-methylvinyl group set forth above.

The polymeric starting materials can range from liquid to rubbery to solid resinous materials, depending upon the monomers employed and the method of preparation. For example, copolymers of a conjugated diene with a vinylpyridine, when prepared by emulsion polymerization, can range from liquid to rubbery products, depending upon the amount of modifier employed in the polymerization recipe.

The heterocyclic nitrogen bases which are applicable for the production of the polymeric starting materials are those of the pyridine and quinoline series which are copolymerizable with a conjugated diene and contain at least one

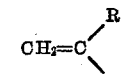

substituent wherein R is either hydrogen or a methyl group, i. e., the substituent is either a vinyl or an alpha-methylvinyl (isopropenyl) group. It is preferred that only one substituent of this type be present and that pyridine be the base instead of quinoline. Various alkyl-substituted derivatives are also applicable but it is preferred that the total number of carbon atoms in the nuclear substituted alkyl groups should not be greater than 12 and most frequently these alkyl substituents are methyl and/or ethyl.

The heterocyclic nitrogen bases are those having the formula

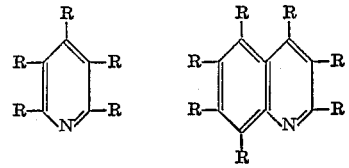

or

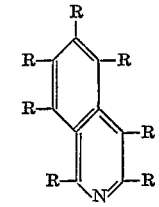

where R is selected from the group consisting of hydrogen, alkyl, vinyl, alpha-methylvinyl, nitro, alkoxy, halo, hydroxy, cyano, aryloxy, aryl, and combinations of these groups such as haloalkyl, alkylaryl, hydroxyaryl, and the like; at least one and not more than two of said groups being selected from the group consisting of vinyl and alpha-methylvinyl; and the total number of carbon atoms in the nuclear-substituted groups being not greater than 12, in addition to those carbon atoms in the vinyl and/or alpha-methylvinyl groups. Examples of such compounds are 2-vinylpyridine; 2-vinyl-5-ethylpyridine; 2,5-divinyl-pyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4,5-divinylpyridine; 2,4-dimethyl-5,6-dipentyl-3-vinylpyridine; 2-decyl-5(alpha-methylvinyl) pyridine; 3,5 - di(alpha-methylvinyl) pyridine; 3-nitro-2-vinylpyridine; 2-vinyl-4-hydroxy-5-nitropyridine; 2-vinyl-3-methyl - 5 - ethylpyridine; 2-methoxy-4-chloro-6 - vinylpyridine; 3 - vinyl - 5 - ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl) pyridine; 3-vinyl-5-phenylpyridine; 2-(para-methylphenyl)-3-vinyl-4-methylpyridine; 3-vinyl-5-(hydroxyphenyl)pyridine; 2-vinylquinoline; 2-vinyl-4-ethylquinoline; 3-vinyl-6,7-di-n-propyl-quinoline; 2-methyl-4-nonyl-6-vinylquinoline; 4(alpha-methylvinyl)-8-dodecylquinoline; 3-vinylisoquinoline; 1,6-dimethyl-3-vinylisoquinoline; 2-vinyl - 4 - benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

The conjugated dienes employed are preferably those which contain from four to six, inclusive, carbon atoms per molecule and include 1,3-butadiene, isoprene, piperylene, methylpentadiene, 2,3-dimethyl-1,3-butadiene, chloroprene, and others. However, conjugated dienes having more than six, such as eight, carbon atoms per molecule can also be used. Furthermore, various alkoxy, such as methoxy and ethoxy, and cyano derivatives of these conjugated dienes, are also applicable. In fact, it has been found that when dealing with fabrics such copolymers are more water repellent than the homopolymers described above. The explanation is that the heterocyclic nitrogen bases are water-soluble whereas such olefins as butadiene are water-insoluble. Hence, the higher the content of heterocyclic base in relation to diolefin the greater the water-solubility of the polymer, and hence the lower is its water-repellency. Conversely the greater the ratio of diolefin to heterocyclic base the greater the water-repellency of the polymer. The conjugated diene component of the copolymer not only imparts water-repellency, but also gives greater flexibility, while the pyridine or quinoline derivative imparts low oil solubility to the product. I use from 25 to 75 parts by weight of the conjugated diolefin and from 75 to 25 parts by weight of the heterocyclic nitrogen base. A specific example of a copolymer which imparts excellent water-repellency characteristics to a fabric is a 50/50 1,3-butadiene/2-methyl-5-vinylpyridine copolymer, either in the form of the free polymeric base or the corresponding quaternary metal salt.

The polymeric metal salts of this invention are of the true quaternary ammonium type, $R_4NX$, having 4 nitrogen-to-carbon bonds, the fifth valence of the nitrogen atom being occupied by the halogen atom. Any halogen except fluorine is operative. A general discussion of the quaternary ammonium compounds of pyridine is available in Sidgwick's Organic Chemistry of Nitrogen (1942), pages 523–527. In addition the quaternization of conjugated diene-heterocyclic nitrogen base copolymers is described in applicant's copending application Serial No. 284,448, filed April 25, 1952. To form quaternary ammonium compounds of pyridine, which in itself contains only three nitrogen-to-carbon bonds, it is obviously necessary that another carbon atom be linked to the nitrogen. This requires that the nitrogen atom of the pyridine be reacted with an organic compound which can dissociate into two groups, one of which attaches through a carbon atom to the nitrogen atom. Illustrative of this is the product formed from cupric chloroacetate and a butadiene/2-methyl-5-vinylpyridine copolymer. This product is believed to have two of its pyridine nuclei combined with the cupric chloroacetate in the following manner:

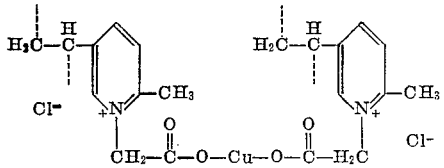

The metal salts of inorganic acids obviously will not operate to form quaternary ammonium compounds with pyridine because they would not supply the additional carbon atom required to quaternize the nitrogen atom, that is, to give it 4 carbon-to-nitrogen bonds. In other words when inorganic metal salts are reacted with a pyridine polymer it is obviously impossible for a quaternary salt of the pyridine polymer to be formed. If for example one were to react a butadiene/2-methyl-5-vinylpyridine copolymer with a metal phosphate, the product would presumably have the formula

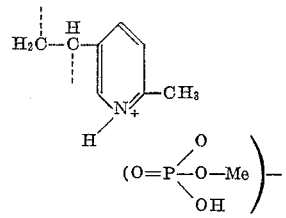

where Me is a metal.

Compounds of this type are disclosed in U. S. 2,619,445 and are not within the scope of the present invention.

The salts used as quaternizing materials in this invention contain as their cation any metal having fungicidal properties. In practice this covers most of the metals having an atomic weight greater than 46, such as titanium, chromium, nickel, copper, zinc, silver, tin, mercury, lead, and the like. Some metallic ions possess more fungicidal qualities than do others; especially effective are the ions of copper, zinc, and mercury. The anion of the salt is derived from a mono- or polycarboxylic acid containing not more than about 20 carbon atoms per molecule, and containing an active halogen atom. By "active halogen atom" I mean either a chlorine, bromine, or iodine atom positioned on a carbon atom alpha to an activating group such as a carbonyl group, the oxygen of an ether linkage, or an unsaturated linkage.

This class of acids includes, e. g., alpha-haloaliphatic carboxylic acids of the homologous series beginning with chloro-, bromo-, and iodoacetic acid and ending with alpha-chloro-, alpha-bromo-, and alpha-iodo-eicosanoic acid. These acids may be aryl-substituted at any point in the carbon chain, e. g., 2-bromo-4-phenylbutyric acid, 2-chloro-3-phenylpropionic acid, 2-iodo-5-phenylheptanoic acid, 2-chloro-6-phenylnonanoic acid, 2-bromo-6-phenyldodecanoic acid, 2-iodo-11-phenyltetradecanoic acid, 2-chloro-10-phenyldecanoic acid, etc. The chlorinated polycarboxylic acids are also applicable, for example chloropropanedioic acid, 4-bromo-2-octenedioic acid, 2-iodobutanedioic acid, etc.

Examples of acids wherein an ether linkage is the activating group for the halogen atom include: (alpha-chloroethoxy)acetic acid, 2 - (alpha-bromopropoxy) butyric acid, 3-(alpha-iodobutoxy) valeric acid, 5-(alpha-chloropentoxy) decanoic acid, 6-(alpha-bromoethoxy) dodecanoic acid, etc.

Examples of acids wherein an ethylenic linkage is the activating group include: 3-chloro-, 3-bromo-, and 3-iodo-4-pentenoic acid, 4-chloro-, 4-bromo-, and 4-iodocrotonic acid, 5-chloro-, 5-bromo-, and 5-iodohexenoic acid, and 8-chloro-, 8-bromo-, and 8-iodo-9-hendecenoic acid.

While the aforesaid functional groups have been shown as univalent radicals it may be possible to employ any one of these groups even when it constitutes one member of a repeating series of such members in a polymer. In this case the functional group would, as part of a polymer, function in the same manner as if uncombined with a polymer.

The polymeric quaternary salts can be applied to fabric in various ways. In one method of operation the fabric is immersed in an aqueous acidic solution of the vinylpyridine polymer to which has been added an aqueous solution of a heavy metal salt of the type described above. After excess liquid has been removed from the fabric by passing it between rollers or centrifuging it, the fabric is partially dried. It is then heated, as by ironing, at temperatures within the range of from about 50° to 250° C. to complete the quaternization reaction. If desired, the fabric may be immersed in successive baths, one of which contains the dissolved polymer, and the other of which contains the dissolved heavy metal salt of the halo-acid. Or, the polymer may first be precipitated on the fabric by immersing the fabric first in an acid solution of the polymer and then in an alkaline bath; the treated fabric is then immersed in a solution of the quaternizing agent. In a preferred embodiment of this invention, the impregnating bath comprises a water-isopropyl alcohol solution of cupric chloroacetate and a copolymer of butadiene and 2-methyl-5-vinylpyridine solubilized with aqueous acetic acid and isopropyl alcohol.

The solubilization of the polymer is usually accomplished with an excess of the stoichiometric amount of acid required to combine with all the amino nitrogen atoms. Less than this amount, however, can be used in some cases. With certain polymers, as little as 25 percent of the stoichiometric amount can be used and still effect solution of the polymer. Treatment with acid converts the basic groups in the polymer to the pyridinium or quinolinium salt. Acids which are applicable include inorganic acids such as hydrochloric, hydrobromic, hydriodic, sulfuric, nitric, and phosphoric acids, and organic acids generally containing between one and four carbon atoms per molecule such as formic, acetic, propionic, butyric, oxalic, malonic, succinic, glycolic, chloroacetic, dichloroacetic, and trichloracetic acids. The amount and type of acid employed is dependent upon the properties desired in the final product. Generally the polymer is treated with acid sufficient to react with from 10 to 100 percent of the basic groups in the polymer and preferably from 50 to 100 percent of the basic groups in the polymer.

Instead of employing aqueous solutions, it is possible to employ emulsions, suspensions, or organic solutions, if desired. For example, a fabric can be immersed first in an aqueous acid solution of the polymer and then in an oil-in-water emulsion of the metal salt (the salt being in the organic phase). Such an emulsion is prepared by dissolving the metal salt in a water-immiscible organic solvent and adding it to water. In this way the entire reaction can be conducted in an aqueous medium. Acetone, benzene, isopropyl alcohol, and the like, are suitable organic solvents.

In general, fabric is impregnated with the polymeric quaternary salts in amounts ranging from 0.1 to 10 parts by weight per 100 parts by weight of the material treated, and preferably, from 0.5 to 5 parts by weight.

The fungicidal polymeric quaternary salts of my invention are also useful as ingredients of paints, coatings, films and other articles where it is desired to impart mildew resistance to the article. They are also effective as seed disinfectants.

The invention is further illustrated by the following examples.

Poly-3-methyl-5-vinylpyridine (I) and a butadiene/2-methyl-5-vinyl-pyridine copolymer (II) were prepared by emulsion polymerization at 50° C. in accordance with the following recipes:

TABLE A

|  | Parts by Weight | |
| --- | --- | --- |
|  | I | II |
| 2-Methyl-5-vinylpyridine | 100 | 50 |
| 1,3-Butadiene |  | 50 |
| Water | 180 | 180 |
| Soap flakes (sodium fatty acid soap) | 5 | 5 |
| $K_2S_2O_8$ | 0.3 | 0.3 |
| Mercaptan blend [1] | 0.3 | 0.3 |

[1] A blend of tertiary $C_{12}$, $C_{14}$, and $C_{16}$ aliphatic mercaptans in a ratio of 3:1:1 parts by weight.

The latex was shortstopped at an average conversion of 68% with 0.1 part di-tert-butyl hydroquinone. As an antioxidant 2% by weight of phenyl-beta-naphthylamine based on the weight of the polymer was added. The brine-alcohol method of coagulation was used; then the polymer was washed free of soap and dried.

Samples of 10-ounce cotton duck which had been laundered and dry cleaned to remove any sizing or finishing oils were treated as hereinafter described. One untreated sample was reserved as a control. After treatment, samples were subjected to tests to determine their resistance to fungi and other microorganisms. Water repellency was also determined.

*Soil burial test*

In this test, fabric was buried for 30 days at room temperature in moist soil of the type capable of supporting good plant growth. Such soil contains, among other microorganisms, cellulose-destroying fungi and bacteria. At the end of 30 days, the reduction in breaking strength of one-inch wide strips of fabric was measured.

*Microbiological test with* Chaetomium Globosum

In this test the mildew resistance of strips of treated cotton duck was determined by measuring their reduction in breaking strength after inoculation and incubation with the fungus *Chaetomium globosum.*

An inoculum of *Chaetomium globosum* was prepared by dispersing in water the scrapings from a ripe fruiting culture.

Into eight ounce square bottles was poured a culture medium prepared by mixing together and heating in an autoclave a mixture consisting of 3 grams of $NH_4NO_3$, 2 grams of $K_2HPO_4$, 2.5 grams of $KH_2PO_4$, 2 grams of $MgSO_4 \cdot 7H_2O$, 20 grams of Bacto-agar, and 1.0 liter of water. After the bottles and their contents had been sterilized in an autoclave for 20 minutes at 15 pounds pressure and 120° C., they were placed on their sides. As they cooled, the agar hardened. A sterile piece of filter paper for the culture to feed upon was placed on top of the medium. Over its surface was spread 1 to 2 cc. of the inoculum of *Chaetomium globosum* prepared as described above. The bottles, thus prepared, were held at an incubation temperature of about 85° F. for 3 to 4 days, until a mycelial mat developed. On top of this mat was placed a sample of treated cotton duck, which had been leached in water for 24 hours in order to extract water-soluble preservatives that would be removed normally by rain or other weather conditions. For example such salts as cupric chloroacetate would be extracted from the fabrics during a 24-hour water extraction unless chemically combined with the polymer. Over this fabric, more inoculum was spread. After 14 more days at about 85° F. the fabric was removed, washed free of fungi, dried and tested for breaking strength.

*Water repellency test*

The water spray test, standard test method 22–41, 1950 Technical Manual and Yearbook of the American Association of Textile Chemists and Colorists, was used for determining water repellency. In this test, a specimen, stretched tightly in a six-inch embroidery hoop, is held at a 45° angle six inches below a standard spray head. After pouring 250 cc. of water through the spray head the fabric is rated with respect to its water repellency. Ratings are made on a scale or zero to 100 where zero represents complete wetting of upper and lower surfaces and 100 represent complete absence of wetting. A rating of 50 indicates complete wetting of upper fabric surface, 70 signifies partial wetting of upper surface, 80 represents partial wetting to give a sharp spray-head pattern, and 90 indicates slight random wetting of upper surface.

EXAMPLE 1

A butadiene-methylvinylpyridine copolymer, prepared according to the recipe of Table A, was dissolved in a mixture of isopropyl alcohol, acetic acid, and water to form a solution containing 2 weight percent of polymer, 10.0 weight percent of acetic acid and 20 weight percent of isopropyl alcohol. The method of preparing this solution was as follows: The polymer, cut in small pieces, was let stand about one day in contact with a mixture comprising one half the total quantity of glacial acetic acid and isopropyl alcohol. At the end of this time, increments of the remaining alcohol and acid containing increasing amounts of water were added, with agitation, until the last addition was water alone. To this solution was added a sufficient quantity of a solution of cupric chloroacetate in a water-isopropyl alcohol mixture to provide one-half mol of cupric chloroacetate for each mol of nitrogen atom in the polymer. Cotton duck was immersed in this solution, and was then squeezed between rollers to remove excess liquid. After the fabric had been partially dried, it was heated with an electric iron, water-leached for 24 hours, and dried. Samples of this fabric, when tested for water repellency and resistance to deterioration caused by *Chaetomium globosum* and by most soil, were found to be much superior to an untreated sample of fabric. Measured in tensile strength (pounds pull per one inch wide strip) the results are as follows:

|  | Tensile Strength After— | | | Water Repellency |
|---|---|---|---|---|
|  | No Exposure | 30 Days Soil Burial | 14 Days' Exposure to *Chaetomium globosum* |  |
| Untreated Fabric | 119 | 46 | 5 | 50 |
| Treated Fabric | 99 | 93 | 100 | 90 |

EXAMPLE 2

Poly-2-methyl-5-vinylpyridine, prepared as described in Table A, was dissolved in an aqueous solution of hydrochloric acid in the proportion of 5 grams of polymer per 100 cc. of the solution. Sufficient hydrochloric acid was used to effect complete neutralization of the polymer. A sample of cotton duck was immersed in the polymer solution, squeezed to remove the excess solution, washed with 0.05 N sodium hydroxide solution, rinsed, and dried at 60° C. After a soil burial test of 30 days duration, the fabric was severely attacked by fungus. It was only slightly better than the untreated fabric.

The above description and examples are intended to be illustrative only. Any modification thereof which conforms to the spirit of the invention is intended to be within the scope of the claims.

I claim:

1. The process for the preparation of a fungicidal composition comprising reacting a metal salt of a carboxylic acid containing an active halogen atom selected from the group consisting of chlorine, iodine and bromine being positioned on a carbon atom alpha to an activating group and not over 20 carbon atoms with a polymer of a compound having a structure selected from the group consisting of

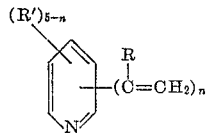 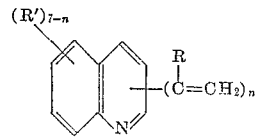

and

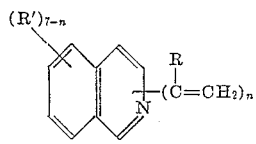

wherein n is an integer selected from the group consisting of 1 and 2, R is selected from the group consisting of H and CH₃, and each R' is individually selected from the group consisting of nitro, alkoxy, halo, hydroxy, cyano, aryloxy, aryl, haloalkyl, alkaryl, hydroxyaryl, hydrogen, and alkyl, not more than 12 carbon atoms being present in the total of said R' groups, to form a water-insoluble quaternary metal salt of the polymer.

2. Process of claim 1 wherein the metal portion of the salt is selected from the group consisting of copper, zinc, and mercury.

3. Process of claim 1 wherein the acid portion of the salt is derived from the group consisting of alpha-haloaliphatic carboxylic acids, aryl substituted alpha-haloaliphatic carboxylic acids, olefinic carboxy acids having a halogen atom positioned alpha to the double bond, and carboxy acids containing a halogen atom positioned alpha to an ether linkage.

4. A water-insoluble polymeric quaternary ammonium compound prepared by reacting a heavy metal salt of an organic acid selected from the group consisting of mono- and poly-carboxylic acids containing an active halogen atom selected from the group consisting of chlorine, iodine and bromine being positioned on a carbon atom alpha to an activating group and not over 20 carbon atoms with a polymer of a compound having a structure selected from the group consisting of

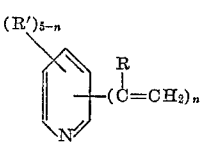 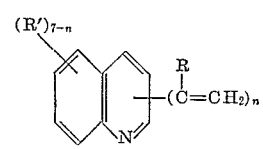

and

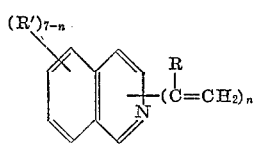

wherein n is an integer selected from the group consisting of 1 and 2, R is selected from the group consisting of H and CH₃, and each R' is individually selected from the group consisting of nitro, alkoxy, halo, hydroxy, cyano, aryloxy, aryl, haloalkyl, alkaryl, hydroxyaryl, hydrogen, and alkyl, not more than 12 carbon atoms being present in the total of said R' groups.

5. Product of claim 4 wherein the polymer is a copolymer of 2-methyl-5-vinylpyridine and 1,3-butadiene.

6. Product of claim 4 wherein the polymer is a homopolymer of 2-methyl-5-vinylpyridine.

7. Product of claim 4 wherein the polymer is a copolymer of 2-vinyl-5-ethylpyridine and 1,3-butadiene.

8. Product of claim 4 wherein the polymer is a homopolymer of 2-vinylpyridine.

9. Product of claim 4 wherein the polymer is a copolymer of 2-vinylpyridine and 1,3-butadiene.

10. Product of claim 4 wherein the metal salt is cupric chloroacetate and the polymer is prepared by the copolymerization of a mixture containing 50 parts by weight of 2-methyl-5-vinylpyridine and 50 parts by weight of 1,3-butadiene.

11. Process of claim 4 wherein the said active halogen atom is alpha to an activating group selected from the group consisting of a carbonyl group, the oxygen of an ether linkage and an unsaturated linkage.

12. A process for treating a material to render it waterproof and resistant to fungi which comprises impregnating said material with a solution containing a heavy metal salt of a carboxylic acid of 1 to 20 carbon atoms and containing an active halogen atom selected from the group consisting of chlorine, iodine and bromine being positioned on a carbon atom alpha to an activating group and a polymer of a compound having a structure selected from the group consisting of

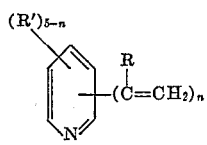 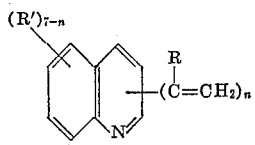

and

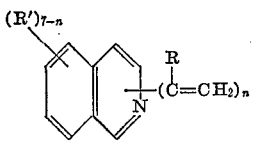

wherein $n$ is an integer selected from the group consisting of 1 and 2, R is selected from the group consisting of H and $CH_3$, and each R' is individually selected from the group consisting of nitro, alkoxy, halo, hydroxy, cyano, aryloxy, aryl, haloalkyl, alkaryl, hydroxyaryl, hydrogen, and alkyl, not more than 12 carbon atoms being present in the total of said R' groups; removing the article from solution and heating it, whereby from 0.1 to 10 percent by weight of the quaternary metal salt of the polymer is deposited in and on the article, based on the dry weight thereof.

13. Process of claim 12 wherein the material is contacted with an aqueous acid solution containing both the polymer and the metal salt.

14. Process of claim 12 wherein the material is contacted with successive solutions, one containing the dissolved polymer and the other containing the metal salt.

15. Process of claim 12 wherein the material is first contacted with an acid solution of the polymer, then contacted with an alkali to precipitate polymer in and on the article, and finally contacted with the metal salt solution to effect quaternization of the precipitated polymer.

16. An absorbent material impregnated with the reaction product of (1) a heavy metal salt of an organic carboxylic acid containing not over 20 carbon atoms and containing an active halogen atom selected from the group consisting of chlorine, iodine and bromine being positioned on a carbon atom alpha to an activating group, and (2) a polymer of a compound having a structure selected from the group consisting of

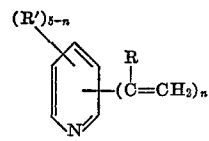 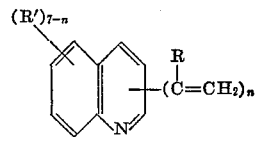

and

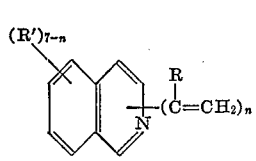

wherein $n$ is an integer selected from the group consisting of 1 and 2, R is selected from the group consisting of H and $CH_3$, and each R' is individually selected from the group consisting of nitro, alkoxy, halo, hydroxy, cyano, aryloxy, aryl, haloalkyl, alkaryl, hydroxyaryl, hydrogen, and alkyl, not more than 12 carbon atoms being present in the total of said R' groups, to form a water-insoluble quaternary metal salt of the polymer; said impregnated article being both water repellent and resistant to fungi, and containing 0.1 to 10 percent by weight of the quaternary salt based on the dry weight of the article.

17. The material of claim 16 wherein the metal ion of the salt is selected from the group consisting of mercury, copper, and zinc and the acid portion of the salt contains a halogen atom in a position alpha to an activating group selected from the class consisting of a carbonyl group, the oxygen of an ether linkage, and an unsaturated linkage.

18. A water-insoluble polymeric quaternary ammonium compound prepared by reacting a heavy metal salt of a mono-halo substituted carboxylic acid containing not more than 20 carbon atoms, said halogen selected from the group consisting of chlorine, iodine and bromine and being positioned so as to be active, with a polymer of a compound having a structure selected from the group consisting of

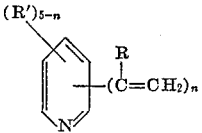 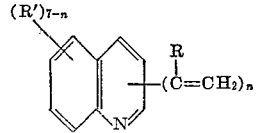

and

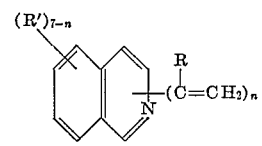

wherein $n$ is an integer selected from the group consisting of 1 and 2, R is selected from the group consisting of H and $CH_3$, and each R' is individually selected from the group consisting of nitro, alkoxy, halo, hydroxy, cyano, aryloxy, aryl, haloalkyl, alkaryl, hydroxyaryl, hydrogen, and alkyl, not more than 12 carbon atoms being present in the total of said R' groups.

19. Product of claim 18 wherein the metal of the salt is selected from the group consisting of copper, zinc and mercury.

20. Product of claim 19 wherein the acid portion of the salt is derived from the group consisting of alpha-haloaliphatic carboxylic acids, aryl substituted alpha-haloaliphatic carboxylic acids, olefinic carboxy acids having a halogen atom positioned alpha to the double bond, and carboxy acids containing a halogen atom positioned alpha to an ether linkge.

21. A process for preparing a fungicidal impregnant comprising mixing an acid solution of a copolymer of 1,3-butadiene and 2-methyl-5-vinylpyridine with a cupric chloroacetate solution to form a water-insoluble polymeric quaternary salt.

22. A process of impregnating a textile article with a fungicide comprising immerising said article in a solution prepared by adding to an acidic solution of a cooplymer of 1,3-butadiene and 2-methyl-5-vinylpyridine polymer a sufficient quantity of a water-isopropanol solution of cupric chloroacetate to provide ½ mol of cupric chloroacetate for each mol of nitrogen in the polymer, whereby quaternization of the polymer is initiated; removing the article from the solution, partially drying it, and then heating it to complete the quaternization reaction.

References Cited in the file of this patent

UNITED STATES PATENTS

| | | |
|---|---|---|
| 2,471,261 | Cook | May 4, 1949 |
| 2,480,084 | Meyer | Aug. 23, 1949 |
| 2,658,850 | Cislak | Nov. 10, 1953 |
| 2,688,008 | Chaney | Aug. 31, 1954 |
| 2,751,323 | Prichard et al. | June 19, 1956 |
| 2,752,393 | Martin | June 26, 1956 |
| 2,767,159 | Potts | Oct. 16, 1956 |

UNITED STATES PATENT OFFICE
CERTIFICATE OF CORRECTION

Patent No. 2,848,356                                          August 19, 1958

James E. Pritchard

It is hereby certified that error appears in the printed specification of the above numbered patent requiring correction and that the said Letters Patent should read as corrected below.

Column 5, line 54, for "Poly-3-methyl-5-vinylpyridine" read -- Poly-2-methyl-5-vinylpyridine --; column 6, line 66, for "represent" read -- represents --; column 7, line 21, for "most" read -- moist --; column 10, line 37, after "metal" insert "portion".

Signed and sealed this 14th day of April 1959.

(SEAL)
Attest:

KARL H. AXLINE                                        ROBERT C. WATSON
Attesting Officer                                   Commissioner of Patents